United States Patent
Bachman et al.

(10) Patent No.: US 9,700,855 B2
(45) Date of Patent: *Jul. 11, 2017

(54) MIXER FOR CONTINUOUS FLOW REACTOR

(71) Applicants: Gene W. Bachman, Baton Rouge, LA (US); Raymond M. Jones, Pearland, TX (US); Michael D. Cloeter, Lake Jackson, TX (US); Charles W. Lipp, Lake Jackson, TX (US); Mark J. Bartel, Baton Rouge, LA (US); Brady J. Coomes, Drochtersen-Assel (DE); Scott J. Daigle, Lake Jackson, TX (US); Steve F. Janda, Lake Jackson, TX (US)

(72) Inventors: Gene W. Bachman, Baton Rouge, LA (US); Raymond M. Jones, Pearland, TX (US); Michael D. Cloeter, Lake Jackson, TX (US); Charles W. Lipp, Lake Jackson, TX (US); Mark J. Bartel, Baton Rouge, LA (US); Brady J. Coomes, Drochtersen-Assel (DE); Scott J. Daigle, Lake Jackson, TX (US); Steve F. Janda, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 243 days.

This patent is subject to a terminal disclaimer.

(21) Appl. No.: 14/456,528

(22) Filed: Aug. 11, 2014

(65) Prior Publication Data

US 2014/0355373 A1    Dec. 4, 2014

Related U.S. Application Data

(63) Continuation of application No. 12/449,602, filed as application No. PCT/US2007/006641 on Mar. 15, 2007, now Pat. No. 8,827,544.

(51) Int. Cl.
*B23P 19/00*    (2006.01)
*B01J 19/24*    (2006.01)
(Continued)

(52) U.S. Cl.
CPC ........ *B01F 5/0275* (2013.01); *B01F 3/0446* (2013.01); *B01F 3/0865* (2013.01);
(Continued)

(58) Field of Classification Search
CPC ............ B23P 19/00; B01F 15/00844; B01F 2005/0017; B01F 2215/0036;
(Continued)

(56) References Cited

U.S. PATENT DOCUMENTS 1,496,345 A    6/1924    Lichtenhaeler
2,740,616 A    4/1956    Walden
(Continued)

FOREIGN PATENT DOCUMENTS

CA    1300320    5/1992
DE    2046254    4/1971
(Continued)

OTHER PUBLICATIONS

International Search Report and Written Opinion for related PCT Application PCT/US2007/006641, dated Nov. 22, 2007 (13 pgs).

*Primary Examiner* — Tony G Soohoo
(74) *Attorney, Agent, or Firm* — Brooks, Cameron & Huebsch, PLLC

(57) ABSTRACT

A mixer for a continuous flow reactor and methods for forming the mixer and the operation thereof. The mixer allows for segmentation of a primary reactant flow through a plurality of ports into many smaller flows that are injected as jets into a secondary reactant flow in channels of the mixer. The channel has a constant width dimension to enhance even flow distribution and local turbulence of the (Continued)

primary and secondary reactant flows. The constant width dimension of the channel and the size and number of the ports of the mixer can be configured to ensure the primary reactant flow injected into the channel directly impinges on a surface of the channel that is opposite the injection point at normal operating conditions.

13 Claims, 5 Drawing Sheets

(51) Int. Cl.
    *B01F 3/04* (2006.01)
    *B01F 3/08* (2006.01)
    *B01F 5/00* (2006.01)
    *B01F 5/02* (2006.01)
    *B01F 15/00* (2006.01)
    *B01F 5/04* (2006.01)

(52) U.S. Cl.
    CPC ............ *B01F 5/048* (2013.01); *B01F 5/0463* (2013.01); *B01F 5/0475* (2013.01); *B01J 19/2405* (2013.01); *B23P 19/00* (2013.01); *B01F 15/00844* (2013.01); *B01F 2005/0017* (2013.01); *B01F 2215/0036* (2013.01); *Y10T 29/49826* (2015.01)

(58) Field of Classification Search
    CPC .... B01F 3/0446; B01F 3/0865; B01F 5/0275; B01F 5/0463; B01F 5/0475; B01F 5/048; B01J 19/2405
    See application file for complete search history.

(56) References Cited

U.S. PATENT DOCUMENTS

| | | | |
|---|---|---|---|
| 2,747,844 A | | 5/1956 | Slayter |
| 3,167,305 A | | 1/1965 | Backx et al. |
| 3,219,483 A | | 11/1965 | Goos et al. |
| 3,332,442 A | | 7/1967 | Reed |
| 3,409,274 A | | 11/1968 | Lawton |
| 3,721,341 A | * | 3/1973 | Lindblom ................ B07C 5/14 209/652 |
| 3,752,653 A | | 8/1973 | Weber |
| 3,818,938 A | * | 6/1974 | Carson ................ B01F 5/0405 239/427.5 |
| 4,289,732 A | | 9/1981 | Bauer et al. |
| 4,377,257 A | | 3/1983 | Geise |
| 4,886,369 A | | 12/1989 | Hankison |
| 4,909,997 A | | 3/1990 | Mitchell et al. |
| 4,944,599 A | | 7/1990 | Soechtig |
| 4,975,265 A | | 12/1990 | Hed |
| 4,994,242 A | | 2/1991 | Rae et al. |
| 5,004,484 A | | 4/1991 | Stirling et al. |
| 5,017,343 A | | 5/1991 | Cetinkaya |
| 5,017,728 A | | 5/1991 | McKinnie et al. |
| 5,059,722 A | | 10/1991 | Mitchell et al. |
| 5,117,048 A | | 5/1992 | Zaby et al. |
| 5,190,733 A | | 3/1993 | Ajinkya et al. |
| 5,230,253 A | | 7/1993 | Blough, Jr. et al. |
| 5,246,673 A | | 9/1993 | Hed |
| 5,340,549 A | | 8/1994 | Ajinkya et al. |
| 5,397,179 A | | 3/1995 | Berlin et al. |
| 5,409,672 A | | 4/1995 | Cetinkaya |
| 5,452,955 A | | 9/1995 | Lundstrom |
| 5,520,456 A | | 5/1996 | Bickerstaff |
| 5,765,946 A | | 6/1998 | Lott |
| 5,779,361 A | | 7/1998 | Sugiura |
| 5,820,256 A | | 10/1998 | Morrison |
| 5,845,993 A | | 12/1998 | Shirtum et al. |
| 5,908,913 A | | 6/1999 | Orthmann et al. |
| 6,000,839 A | | 12/1999 | Lott |
| 6,017,022 A | | 1/2000 | Shirtum |
| 6,032,931 A | * | 3/2000 | Plunkett .............. B01F 3/04517 210/220 |
| 6,076,955 A | | 6/2000 | Wallther |
| 6,179,997 B1 | | 1/2001 | Vedder, Jr. et al. |
| 6,190,624 B1 | | 2/2001 | Romatier |
| 6,203,187 B1 | | 3/2001 | Abbasi et al. |
| 6,341,888 B1 | * | 1/2002 | Ekholm ................ B01F 5/0475 366/160.1 |
| 6,347,883 B1 | | 2/2002 | Ekholm |
| 6,361,697 B1 | | 3/2002 | Coury et al. |
| 6,399,031 B1 | | 6/2002 | Herrmann et al. |
| 6,471,392 B1 | | 10/2002 | Holl et al. |
| 6,506,949 B2 | | 1/2003 | Gillis et al. |
| 6,612,731 B2 | | 9/2003 | Nishida et al. |
| 6,623,154 B1 | | 9/2003 | Garcia |
| 6,659,635 B2 | | 12/2003 | Ekholm |
| 6,726,354 B1 | | 4/2004 | Breuer et al. |
| 6,749,329 B2 | | 6/2004 | Shechter et al. |
| 6,752,529 B2 | | 6/2004 | Holl |
| 6,764,660 B1 | | 7/2004 | Wiede, Jr. et al. |
| 6,818,189 B1 | | 11/2004 | Adris et al. |
| 6,838,061 B1 | | 1/2005 | Berg et al. |
| 6,896,401 B2 | | 5/2005 | Wolfert et al. |
| 6,977,064 B1 | | 12/2005 | Adris et al. |
| 6,986,832 B2 | | 1/2006 | Lamminen et al. |
| 7,303,732 B2 | | 12/2007 | Gillis et al. |
| 7,776,213 B2 | * | 8/2010 | Arnaud .............. B01D 21/2433 137/888 |
| 2003/0043690 A1 | | 3/2003 | Holl |
| 2003/0164328 A1 | * | 9/2003 | Arnaud .............. B01D 21/2433 210/512.1 |
| 2003/0227820 A1 | | 12/2003 | Parrent |
| 2004/0018128 A1 | | 1/2004 | Gupta |
| 2004/0154985 A1 | | 8/2004 | Shekunov et al. |
| 2006/0104155 A1 | | 5/2006 | Corti et al. |
| 2006/0153002 A1 | | 7/2006 | Ryan |
| 2006/0187748 A1 | | 8/2006 | Kozyuk |
| 2006/0286015 A1 | | 12/2006 | Holl |
| 2007/0205523 A1 | * | 9/2007 | Kojima ................ B01D 53/18 261/79.2 |

FOREIGN PATENT DOCUMENTS

| | | |
|---|---|---|
| DE | 3224961 | 1/1984 |
| DE | 10302699 | 9/2003 |
| DE | 202006001952 | 7/2007 |
| EP | 0226495 | 6/1987 |
| GB | 1329121 | 9/1973 |
| GB | 2036586 | 7/1980 |
| WO | 02072251 | 9/2002 |
| WO | 2005025732 | 3/2005 |
| WO | 2006065766 | 6/2006 |

* cited by examiner

MIXER FOR CONTINUOUS FLOW REACTOR

CLAIM OF PRIORITY

This application is a Continuation application of U.S. National Stage application 12/449,602, now U.S. Pat. No. 8,827,544, filed Aug. 14, 2009, and published as US 2010/0103769 on Apr. 29, 2010, which claims the benefit to International Application Number PCT/US2007/006641, filed Mar. 15, 2007, and published as WO 2008/115173 on Sep. 25, 2008, the entire contents of which are incorporated herein by reference in its entirety.

FIELD OF THE DISCLOSURE

The present disclosure generally relates to mixers and in particular mixers for continuous flow reactors.

BACKGROUND

Turbulence promotes chemical reactions, heat-transfer operations, mixing, and combustion processes in many chemical processes. Effective use of turbulence can increase the interfacial contact of reagents so as to decrease reaction times and the cost and time of producing many chemicals.

Many existing chemical process units use tubular reactors to continuously mix and react two or more reagents under turbulent diffusion conditions (Re>2000). Reagents can be injected into tubular reactors in a number of different ways. One approach is to introduce the reagents so that they meet at an angle (e.g., 90 degrees). Another approach has the reagents meet coaxially. The coaxial approach, however, is less efficient in inducting rapid mixing between the two fluids compared to when fluids meet at angles.

Examples of such tubular reactors include those illustrated in U.S. Pat. No. 4,909,997 to Mitchel, which provides an illustration of an impingement mixer used in a reaction scheme for producing tetrabromobisphenol-A. Other examples of tubular reactors can be found in U.S. Pat. No. 3,332,442 to Reed; U.S. Pat. No. 5,845,993 to Shirtum; and U.S. Pat. No. 5,117,048 to Zaby.

SUMMARY

Embodiments of the present disclosure include a mixer for a continuous flow reactor that provides for rapid mixing with minimal back-mixing, and methods for forming the mixer and the operation thereof. Specifically, embodiments of the mixer of the present disclosure allow for a primary reactant flow to be segmented through a plurality of ports into many smaller flows that are injected as jets into a secondary reactant flow in channels of the mixer.

For the various embodiments, the channel through which the secondary reactant flow moves and into which the primary reactant flow is injected can have a constant width dimension to enhance even flow distribution and local turbulence. For the various embodiments, the constant width dimension of the channel and the size and number of the ports of the mixer are configured to ensure the primary reactant flow injected into the channel directly impinges on a surface of the channel that is opposite the injection point at normal operating conditions.

To accomplish this, the relative dimensions and predetermined proportional relationships of the mixer allow for the number and diameter of the ports to be sized to provide a Jet Mixing Number, for example, of at least 0.9. Having the Jet Mixing Number of at least 0.9 combined with the number of ports and their position relative the opposite wall of the channel allows for a higher degree of segmentation of the jets while maintaining high jet velocity and good localized mixing. The mixer of the present disclosure can be useful in mixing sensitive (selective) fast-reacting flows.

DETAILED DESCRIPTION

Figure 1:
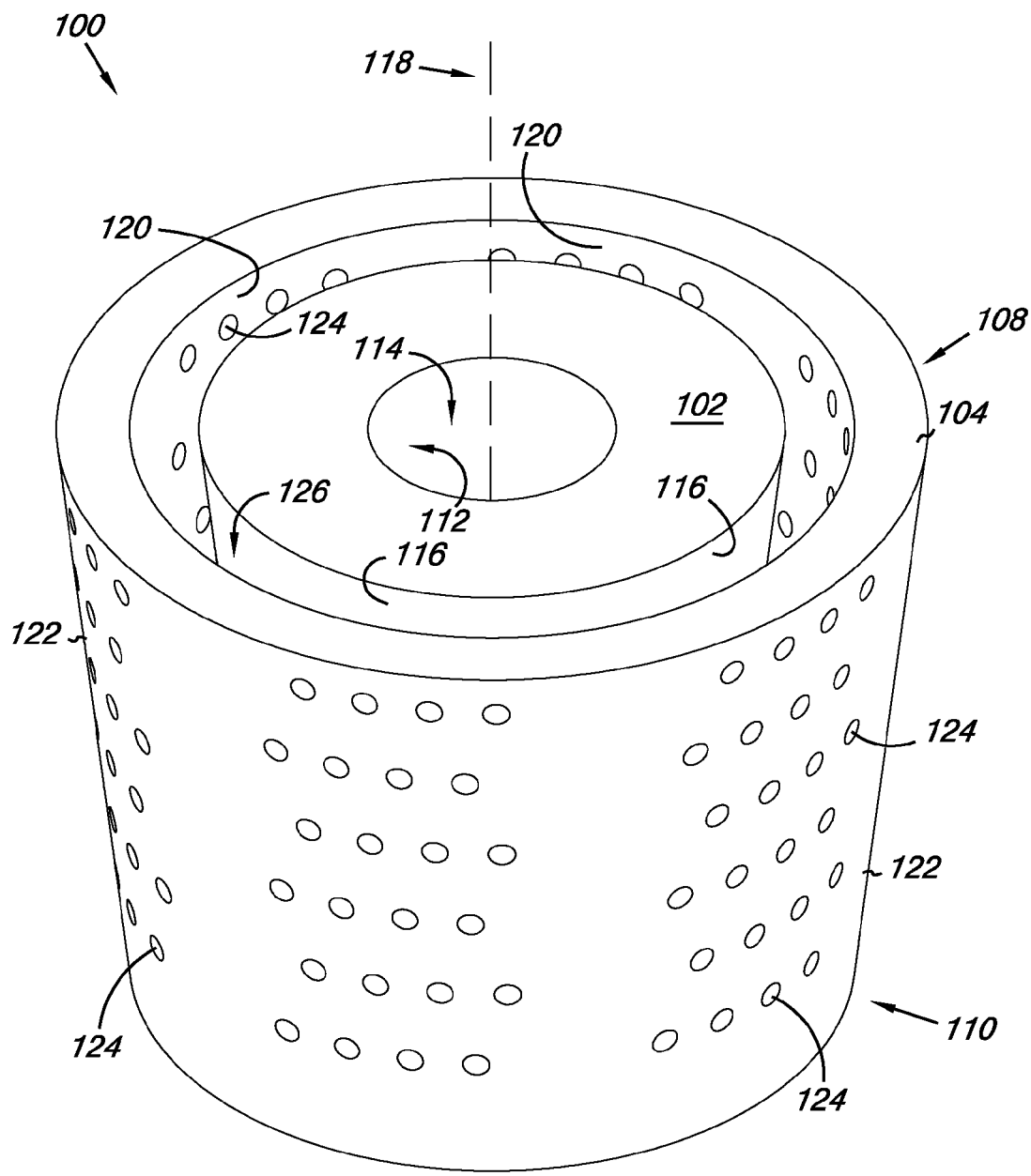
FIG. 1 illustrates one embodiment of a mixer for a continuous flow reactor according to the present disclosure.

Embodiments of the present disclosure include a mixer for a continuous flow reactor that provide for rapid mixing with minimal back-mixing so as to help reduce undesired byproduct formation. To accomplish the rapid mixing, the mixer includes channels having a constant width dimension, and ports that open into the channels. The embodiments of the mixer of the present disclosure can segment and inject a primary reactant flow through the ports of the mixer into a secondary reactant flow moving through a channel of the mixer. Segmenting and injecting the primary reactant flow into the secondary reactant flow can help to minimize the mixing length of the reagents (i.e., allows for mixing of flows in a very short space).

For the various embodiments, the relative flows of the primary and secondary reactant flows can depend on the concentration of the reactants and the stoichiometry of the desired reaction(s). In such cases, the number and size of the ports (i.e., the degree of segmentation) can be determined to ensure that the primary reactant flow injected into the channel directly impinges on a surface of the channel that is opposite the injection point at normal operating conditions. Injecting the primary reactant flow through the number and size of the plurality of the ports also provides a residence time distribution for the reagents having very little variation from the mean residence time for any parcel of fluid.

In one embodiment, the minimized mixing length results from sizing the ports and the channel in such a way as to ensure that the primary reactant flow can have both maximized entrainment with the secondary reactant flow and impinges upon a surface of the channel that is opposite the injection point of the channel to cause turbulent mixing of the reactant flows in the channel of the mixer. This type of mixing can be important when there are fast competing reactions from the reactants and the process required rapid homogeneity in composition.

As used herein the "primary reactant flow" includes at least one reagent that flows through the ports into the channel of the mixer. As used herein the "secondary reactant flow" includes at least one reagent that flows completely through the channel (i.e., from a first end through a second end) and into which the primary reactant flow is jetted.

For the various embodiments, the flow rate of the primary reactant flow can be larger than that of the secondary reactant flow. For example, the primary reactant flow can have a flow rate that comprises the majority of the total volumetric flow exiting the mixer. In one specific example, the primary reactant flow can have a flow rate that is at least twice that of the volumetric flow rate of the secondary reactant flow. In an alternative embodiment, the flow rate of the primary reactant flow can be less than that of the secondary reactant flow. For example, the primary reactant flow can have a flow rate that comprises the minority of the total volumetric flow exiting the mixer.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of valve. In addition, discussion of features and/or attributes for an element with respect to one Figure can also apply to the element shown in one or more additional Figures. Embodiments illustrated in the figures are not necessarily to scale.

As used herein, the terms "a," "an," "the," "one or more," and "at least one" are used interchangeably and include plural referents unless the context clearly dictates otherwise. Unless defined otherwise, all scientific and technical terms are understood to have the same meaning as commonly used in the art to which they pertain. For the purpose of the present invention, additional specific terms are defined throughout.

FIG. 1 provides an illustration of a mixer 100 according to one embodiment of the present disclosure. For the various embodiments, the mixer 100 includes an elongate inner sleeve 102 and an elongate outer sleeve 104. As illustrated, the elongate inner sleeve 102 and the elongate outer sleeve 104 extend between a first end 108 and a second end 110 of the mixer 100.

For the various embodiments, the elongate inner sleeve 102 includes an inside surface 112 that defines an axial opening 114. The axial opening 114 is configured to receive a mounting shaft of a continuous flow reactor, discussed herein, that extends through the first end 108 and the second end 110 of the elongate inner sleeve 102. The elongate inner sleeve 102 also includes an outside surface 116 opposite the inside surface 112. In one embodiment, the outside and the inside surfaces 112 and 116 are concentrically arranged around a longitudinal axis 118 of the mixer 100.

For the various embodiments, the elongate outer sleeve 104 is concentrically arranged with the elongate inner sleeve 102. The elongate outer sleeve 104 includes a first surface 120 and a second surface 122 opposite the first surface 120. The elongate outer sleeve 104 also includes a plurality of ports 124 that extend between and through the first and second surfaces 120 and 122 of the elongate outer sleeve 104.

The mixer 100 further includes a channel 126 that extends through the first end 108 and the second end 110 of the elongate inner and outer sleeves 102, 104. As illustrated, the channel 126 can be defined by the surface of the outside surface 116 of the elongate inner sleeve 102 and the first surface 120 of the elongate outer sleeve 104. The ports 124 provide for fluid communication between the channel 126 and an area outside the second surface 122 of the elongate outer sleeve 104.

For the various embodiments, the channel 126 can have a cross-sectional shape of an annulus (i.e., an annular channel) taken perpendicular to the longitudinal axis 118 of the mixer 100. Other cross-sectional shapes are possible. In addition, the channel 126 has a constant width dimension taken between the outside surface 116 and the first surface 120. As will be discussed herein, the constant width dimension can also have a predetermined proportional relationship to other dimensions of the mixer 100.

As discussed, the ports 124 extend through the elongate outer sleeve 104 to open into the channel 126. In one embodiment, the ports 124 are uniformly distributed across an area of the elongate outer sleeve 104 that helps to define the channel 126. In an alternative embodiment, the ports 124 can be non-uniformly distributed across the area of the elongate outer sleeve 104 that helps to define the channel 126. For example, the ports 124 can have a gradient like distribution extending between the first end 108 and the second end 110 of the mixer 100. Other configurations are possible.

For the various embodiments, the ports 124 segment the primary reactant flow into many smaller flows that are injected as jets into the secondary reactant flow. The secondary reactant flow and the combined reactant flows are constrained to the channel 126 of constant width dimension to enhance even flow distribution and local turbulence. The jets of the first reactant flow are sized to permeate to the opposite wall at nominal operating conditions to provide good mixing and turndown of the reagents in the mixer 100.

For the various embodiments, a methodology used to characterize the jet flow through the ports 124 into a cross flow (i.e., secondary reactant flow in the channel 126) can be defined by a Jet Mixing Number (JMN) calculated by the Formula I:

$$\text{Jet Mixing Number} = \left(\frac{\text{jet velocity in port 124}}{\text{velocity in channel 126}}\right)\left(\frac{\text{diameter of port 124}}{\text{width of channel 126}}\right) \quad \text{Formula I}$$

As used herein, the value of the JMN provides an indication whether the jet flow through the ports 124 permeates across the cross flow and onto the opposite wall (e.g., the outside surface 116 of the elongate inner sleeve 102). For example, for JMN values from about 0.07 to about 1.0, the jet flow permeates the cross flow, turning before it hits the opposite wall. For JMN values less than about 0.07, the jet flow stays along originating wall and does not appreciably permeate into the cross flow. For JMN values of 1.0 or greater the jet flow permeates the cross flow to contact the opposite wall.

For the various embodiments of the present disclosure, the relative dimensions and predetermined proportional relationships, as discussed herein, allow for the diameter of the ports 124 to be sized to provide a JMN of at least 0.07. In an additional embodiment, the diameter of the ports 124 can be sized to provide a JMN in a range of 0.07 to 2.0. In a specific embodiment, the diameter of the ports 124 can be sized to provide a JMN in a range of at least 1.0 to 2.0. Other vales for the JMN are also possible. Such JMN values include 0.9 and 1.0, among others.

These JMN values of at least 0.9 also provide for a time to homogeneity of less than about 0.5 seconds. As used herein, the "time to homogeneity" is taken as the residence time needed before the reactant flow of the primary and secondary reactant flows reach less than about five percent (5%) concentration variance from the mean concentration in the channel. In one embodiment, a time to homogeneity of less than about 0.5 seconds can be beneficial for mixing fast-reacting components having mixing-sensitive reactions and other systems where high turbulence and rapid mixing is beneficial.

As the example of FIG. 1 illustrates, the ports 124 can be arrayed in rows and/or columns between the first and second ends 108, 110 of the channel 126. As illustrated, the embodiment of the mixer 100 illustrated in FIG. 1 has one hundred forty-four (144) ports 124 distributed into sections having six (6) rows of four (4) ports each. As will be appreciated, the number, the size, the spacing and/or the distribution of the ports 124 can be configured to ensure mechanical integrity of the elongate outer sleeve 104 and to ensure that the primary reactant flow impinges on the outside surface 116 of the elongate inner sleeve 102 (i.e., the JMN is 0.9 or greater). Mixers having different numbers and configurations of ports 124 are possible.

In addition, the number and total cross-sectional area of the ports 124 can be selected to provide sufficient segmentation and volumetric flow of the primary reactant flow into the secondary reactant flow as discussed herein. For the various embodiments, the number, size and shape of the ports 124 used with the mixer 100 are configured with the channel 126 to ensure that the fluid jets from the ports 124 permeate the secondary reactant flow to impinge on the opposite wall under normal flow conditions.

For the various embodiments, the cross-sectional shape and size of each of the ports 124 can be selected to allow for a jet of the primary reactant flow to be delivered from each of the ports 124, where the primary reactant flow is both entrained by the secondary reactant flow and impinges upon the outside surface 116 of the elongate inner sleeve 102. For the various embodiments, the outside surface 116 is configured as a continuous arcuate surface against which the primary reactant flow can impinge upon the surface 116 to provide for turbulent mixing of the two reactant flows.

As mentioned, both the size and the cross-sectional shape of the ports 124 can be selected to best accomplish the rapid mixing in the channel 126 of the mixer 100. For example, the ports 124 of the present disclosure can have a number of different cross-sectional shapes. These include, but are not limited to, circular, elliptical (i.e., non-circular), and polygonal, among others. In addition, the walls defining the openings can be tapered or un-tapered (i.e., cross-sectional area changes or does not change from the first surface 120 to the second surface 122). In an additional embodiment, the cross-sectional shapes and/or sizes need not be constant for the ports 124. For example, the ports 124 can have a variety of cross-sectional shapes, sizes and profiles for a given mixer 100.

For the various embodiments, features of the mixer 100 can have predetermined proportional relationships that allows for the dimensions of the features to be determined based on specifying the dimension of one of the features. Having the predetermined proportional relationship for the mixer 100 in turn can accommodate scaling the mixer 100 up or down while maintaining a nearly constant pressure drop through the ports.

So, for example, the inner diameter of the elongate outer sleeve 104 (measured between the first surface 120 through the longitudinal axis 118) can be taken as the relative dimension with which the other values can be determined. Given that the inner diameter of the elongate outer sleeve 104 has a nominal value of 1.00, the diameter of the elongate inner sleeve 102 measured at the outside surface 116 can have a relative value of 0.81 (i.e., eighty-one percent of the value of inner diameter of the elongate outer sleeve 104).

Similarly, the constant width dimension of the channel 126 can have a relative value in a range of 0.01 to 1.0 to the inner diameter of the elongate outer sleeve 104. In one specific embodiment, the constant width dimension of the channel has a relative value of 0.09 to the inner diameter of the elongate outer sleeve 104. In an additional embodiment, the diameter of the port 124 can have a relative value of 0.04 (i.e., four percent of the value of inner diameter of the elongate outer sleeve 104). In an additional embodiment, each of the plurality of ports 124 can have a ratio of 0.4 for the diameter of each port relative to the constant width dimension of the annular channel 126.

Using these relative values then allows the dimension of the different features of mixer 100 to be determined from specifying one dimensional value for the related features. For example, when the channel has a constant width of about 3.2 cm (i.e., the distance between the outside surface of the elongate inner sleeve and the first surface of the elongate outer sleeve) the diameter of the first surface 120 would have a value of about 13.9 cm, each port 124 would have a diameter of about 1.4 cm, and the diameter of the elongate inner sleeve 102 would be about 11.3 cm. These relative values can then be used to scale the features of the mixer 100 up or down depending upon the needs of the user.

In an alternative embodiment, the constant width dimension of the annular channel 136 can have a constant value without regard to predetermined proportional relationships to other features of the mixer 100. For example, the annular channel 136 can have a constant value of about 3.2 cm regardless of the other dimensions of the features in the continuous flow reactor 130.

As discussed herein, the mixer 100 can be formed from the elongate inner sleeve 102 and the elongate outer sleeve 104. In one embodiment, both the inner sleeve 102 and the outer sleeve 104 are formed from a corrosion resistant material. As used herein, corrosion resistant materials include those materials that resist reacting to or do not react with reagents they are in contact with (e.g., the primary and/or secondary reactant flows) and/or the reaction product(s) formed from the reagents. Such reagents can include, but are not limited to, acids, bases, halogens, halogen salts such as bromine, iodine, zinc chloride, and sodium hypochlorite, organic halides and organic acid halides, and acid anhydrides, among others.

Examples of suitable corrosion resistant materials used to form the mixer 100 can include polymers selected from polyoxymethylene, fluoropolymers, such as polytetrafluoroethylene (e.g., Teflon®) and polyvinylidene fluoride (e.g., Kynar®), polyethylene, polyvinyl chloride, polyester polyurethane, polypropylene, polyphenylene sulfide, polysulfone, polyetheretheketones, polyetherimide, chlorinated poly(vinyl chloride), and ethylene chlorotrifluoroethylene.

Additional examples of suitable corrosion resistant materials for the mixer 100 can include ceramics, such as technical ceramics selected from oxides, alumina, zirconia; non-oxides such as carbides, borides, nitrides, silicides; and composites of oxides and non-oxides. In addition, these polymers and/or ceramics can be used with or without reinforcement of fiber glass and/or carbon fiber of up to 30 percent, or greater.

Figure 2:
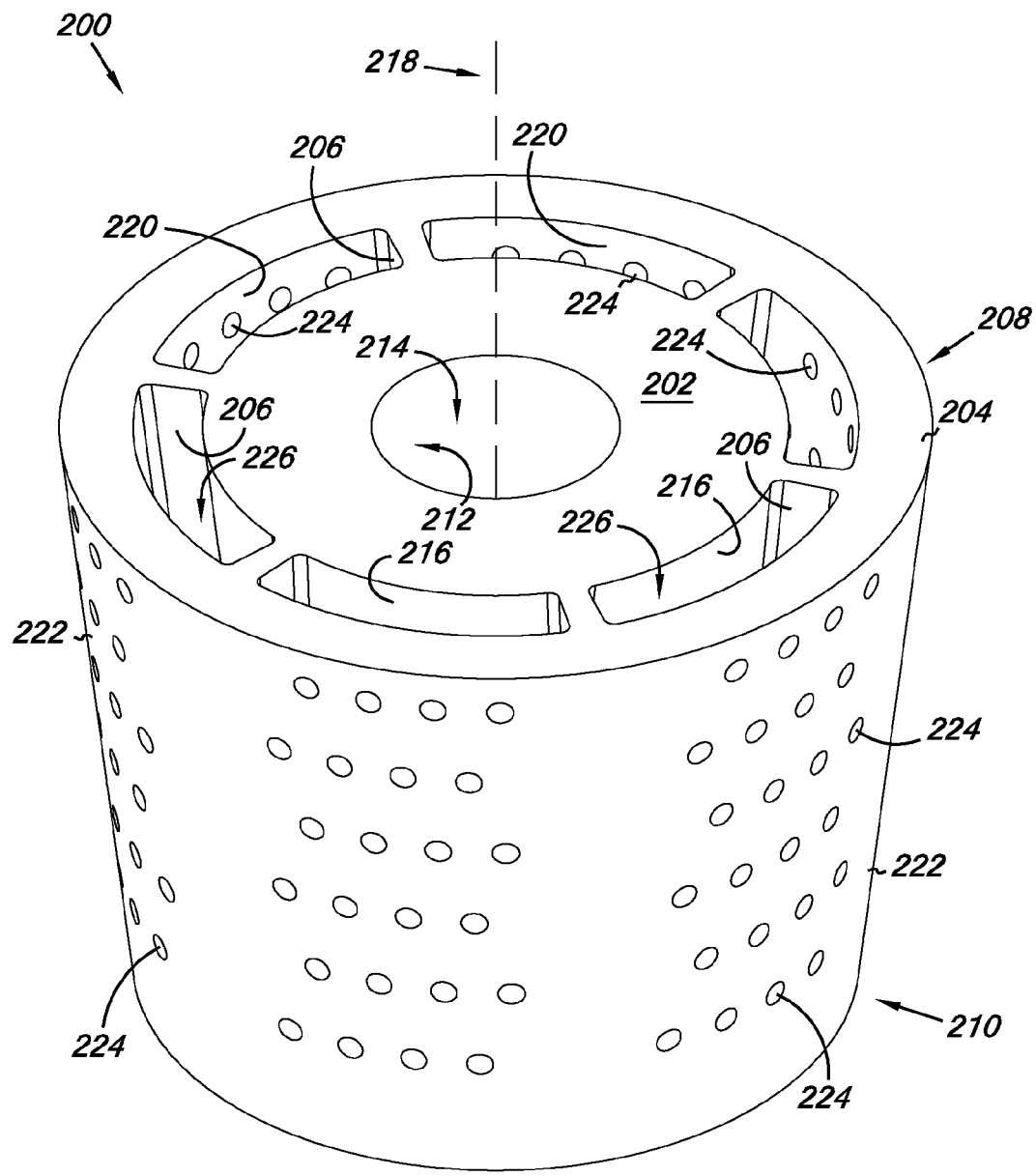
FIG. 2 illustrates one embodiment of a mixer for a continuous flow reactor according to the present disclosure.

FIG. 2 provides an illustration of a mixer 200 according to one embodiment of the present disclosure. For the various embodiments, the mixer 200 has a one piece structure, as compared with a two piece structure illustrated in FIG. 1. As used herein, a "one piece structure" includes structures formed from a single piece of material that does not have a joint or seam (i.e., a location along which two parts are joined) that provide areas for fatigue and or corrosion to occur.

For the various embodiments, the mixer 200 includes the elongate inner sleeve 202, the elongate outer sleeve 204, and a support wall 206 that connects the elongate inner and outer sleeve 202 and 204. As illustrated, the elongate inner sleeve 202, the elongate outer sleeve 204, and the support wall 206 extend between the first end 208 and the second end 210 of the mixer 200.

As illustrated, the elongate inner sleeve 202 includes the inside surface 212 that defines the axial opening 214 configured to receive a mounting shaft of a continuous flow reactor, discussed herein. The elongate inner sleeve 202 also includes the outside surface 216 opposite the inside surface 212. In one embodiment, the outside and the inside surfaces 212 and 216 are concentrically arranged around the longitudinal axis 218 of the mixer 200.

For the various embodiments, the elongate outer sleeve 204 is concentrically arranged with the elongate inner sleeve 202. The elongate outer sleeve 204 includes the first surface 220 and the second surface 222 opposite the first surface 220, with a plurality of the ports 224 extending between and through the first and second surfaces 220 and 222 of the elongate outer sleeve 204.

The mixer 200 further includes the channel 226 that extends through the first end 208 and the second end 210 of the elongate inner and outer sleeves 202, 204 and the support walls 206. As illustrated, each channel 226 can be defined by the surface of the support walls 206, the outside surface 216 of the elongate inner sleeve 202 and the first surface 220 of the elongate outer sleeve 204. The ports 224 provide for fluid communication between the channel 226 and an area outside the second surface 222 of the elongate outer sleeve 204.

For the various embodiments, the channel 226 can have a cross-sectional shape of a sector of an annulus taken perpendicular to the longitudinal axis 218 of the mixer 200. Other cross-sectional shapes are possible. In addition, the channel 226 has a constant width dimension taken between the outside surface 216 and the first surface 220. As will be appreciated, the constant width dimension can be determined by the length of the support wall 206 extending between the outside surface 216 and the first surface 220. As discussed herein, the constant width dimension can also have a predetermined proportional relationship to other dimensions of the mixer 200.

As discussed, the ports 224 extend through the elongate outer sleeve 204 to open into the channel 226. In one embodiment, the ports 224 can be uniformly and/or non-uniformly distributed across the area of the elongate outer sleeve 204 that helps to define the channel 226, as discussed herein. For example, the ports 224 can have a gradient like distribution extending between the first end 208 and the second end 210 of the mixer 200. Other configurations are possible.

For the various embodiments, the ports 224 segment the primary reactant flow into many smaller flows that are injected as jets into the secondary reactant flow moving through the channel 226. The secondary reactant flow and the combined reactant flows are constrained to the channel 226 of constant width dimension to enhance even flow distribution and local turbulence. The jets of the first reactant flow are sized to permeate to the opposite wall at nominal operating conditions to provide good mixing and turndown of the reagents in the mixer 200.

For the various embodiments, the methodology used to characterize the jet flow through the ports 224 into a cross flow (i.e., secondary reactant flow in the channel 226) can be defined by the Jet Mixing Number (JMN) calculated by the Formula I, discussed herein. In one embodiment, the relative dimensions and predetermined proportional relationships, as discussed herein, allow for the diameter of the ports 224 to be sized to provide a JMN of at least 0.07. In an additional embodiment, the diameter of the ports 124 can be sized to provide a JMN in a range of 0.07 to 2.0. In a specific embodiment, the diameter of the ports 124 can be sized to provide a JMN in a range of at least 1.0 to 2.0. These JMN values of at least 0.9 also provide for a time to homogeneity of less than about 0.5 seconds, as discussed herein.

As illustrated in FIG. 2, the ports 224 can be arrayed in rows and/or columns between the first and second ends 208, 210 and the support walls 206 of each channel 226. Each area can include a predetermined number of ports 224 having a total cross sectional area that is sufficient to allow the volume of the primary reactant flow to be introduced into the secondary reactant flow as discussed herein.

For example, as illustrated in FIG. 2 the mixer 200 includes twenty-four (24) ports 224 for in each area of the elongate outer sleeve 204 that helps to define the channel 226. As illustrated, there are a total of six (6) channels 226 for the mixer 200, which gives a total number of ports 224 of one hundred forty-four (144) for the mixer 200. As will be appreciated, the total number of ports 224, their shape, distribution and total cross-sectional area can be tailored to meet the flow requirements of the primary reactant flow for the mixer 200, as discussed herein.

For the various embodiments, the cross-sectional shape and size of each of the ports 224 can be selected to allow for a jet of the primary reactant flow to be delivered from each of the ports 224, where the primary reactant flow is both entrained by the secondary reactant flow and impinges upon the outside surface 216 of the elongate inner sleeve 202. For the various embodiments, the outside surface 216 is configured as a continuous arcuate surface against which the primary reactant flow can impinge upon the surface 216 to provide for turbulent mixing of the two reactant flows.

As mentioned, both the size and the cross-sectional shape of the ports 224 can be selected to best accomplish the rapid mixing in the channel 226 of the mixer 200. For example, the ports 224 of the present disclosure can have a number of different cross-sectional shapes, as discussed herein. In addition, the walls defining the openings can be tapered or un-tapered (i.e., cross-sectional area changes or does not change from the first surface 220 to the second surface 222). In an additional embodiment, the cross-sectional shapes and/or sizes need not be constant for the ports 224. For example, the ports 224 can have a variety of cross-sectional shapes, sizes and profiles for a given mixer 200.

For the various embodiments, features of the mixer 200 can have predetermined proportional relationships that allows for the dimensions of the features to be determined based on specifying the dimension of one of the features. Having the predetermined proportional relationship for the mixer 200 in turn can accommodate scaling the mixer 200 up or down while maintaining a nearly constant pressure drop through the ports.

So, for example, the inner diameter of the elongate outer sleeve 204 (measured between the first surface 220 through the longitudinal axis 218) can be taken as the relative dimension with which the other values can be determined. Given that the inner diameter of the elongate outer sleeve 204 has a nominal value of 1.00, the diameter of the elongate inner sleeve 202 measured at the outside surface 216 has a relative value of 0.81 (i.e., eighty-one percent of the value of inner diameter of the elongate outer sleeve 204).

Similarly, the constant width dimension of the channel 226 can have a relative value in a range of 0.01 to 1.0 to the inner diameter of the elongate outer sleeve 204. In one specific embodiment, the constant width dimension of the channel has a relative value of 0.09 to the inner diameter of the elongate outer sleeve 204. In an additional embodiment, the diameter of the port 224 can have a relative value of 0.04 (i.e., four percent of the value of inner diameter of the elongate outer sleeve 204). In an additional embodiment, each of the plurality of ports 224 can have a ratio of 0.4 for the diameter of each port relative to the constant width dimension of the annular channel 226. Using these relative values then allows the dimension of the different features of mixer 200 to be determined from specifying one dimensional value for the related features, as discussed herein.

In an alternative embodiment, the constant width dimension of the annular channel 236 can have a constant value without regard to predetermined proportional relationships to other features of the mixer 200. For example, the annular channel 236 can have a constant value of about 3.2 cm regardless of the other dimensions of the features in the continuous flow reactor 230.

As discussed herein, the mixer 200 can be formed in a one piece construction process. In other words, the mixer 200 can be formed from a single piece of material. Once piece construction allows for seamless construction of the mixer, allowing the mixer to be used in corrosive environment in which joints and seams may not be durable. In addition, the mixer 200 can also be formed from a number of different corrosion resistant materials, with or without reinforcements, as discussed herein.

Figure 3:
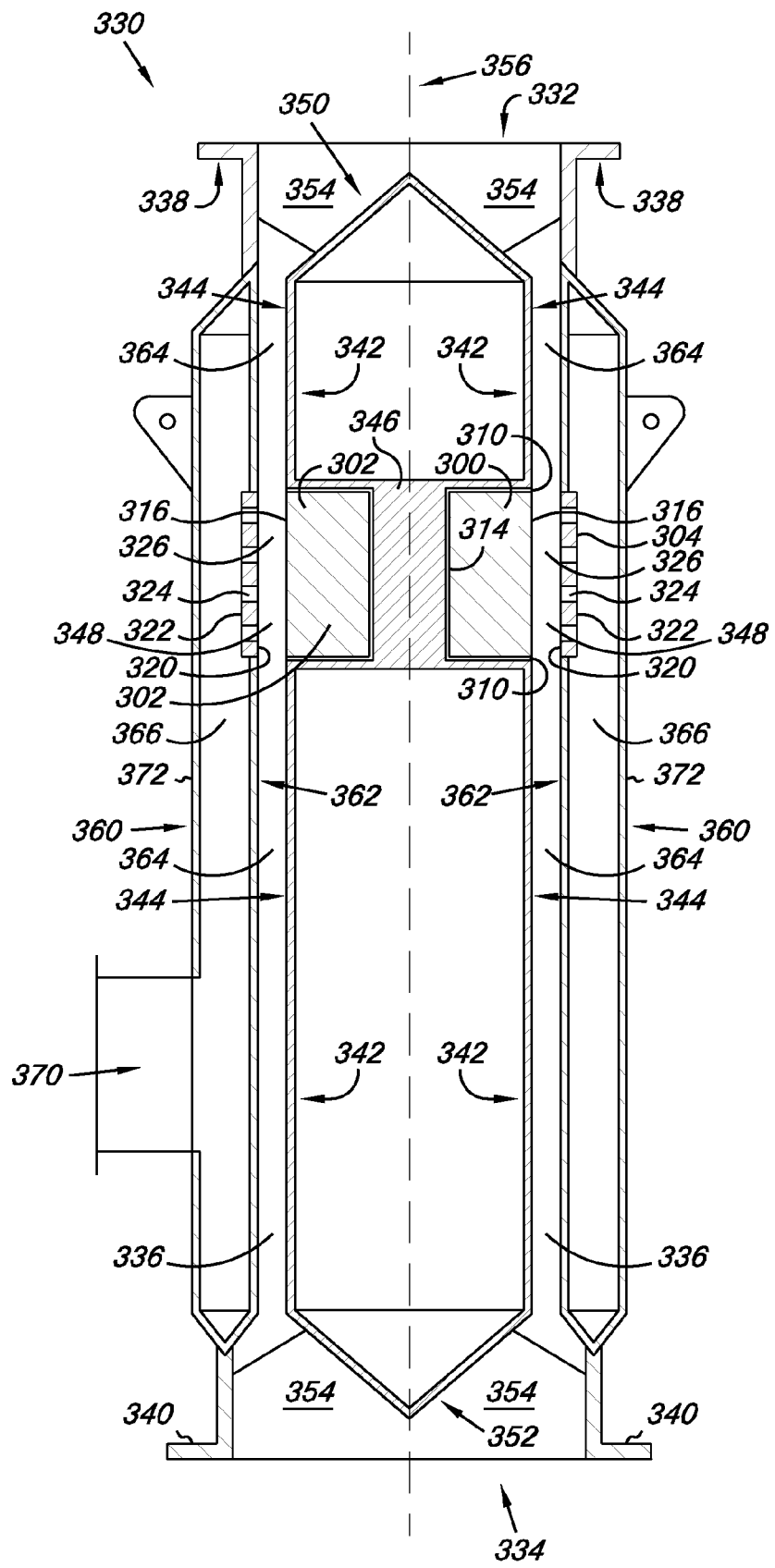
FIG. 3 illustrates a cross-sectional view of one embodiment of a continuous flow reactor and mixer according to the present disclosure.

FIG. 3 illustrates a cross-sectional view of a continuous flow reactor 330 having the mixer 300 according to the present disclosure. For the various embodiments, the continuous flow reactor 330 includes a fluid inlet end 332 and a fluid outlet end 334 spaced apart and connected by an annular channel 336. The continuous flow reactor 330 also includes a first mounting bracket 338 and a second mounting bracket 340 that can be used to couple the continuous flow reactor 330 in a desired location.

For the various embodiments, the continuous flow reactor 330 further includes an elongate core 342 having a first exterior surface 344 and a mounting shaft 346. As illustrated, the mixer 300 can be positioned around the mounting shaft 346, where the mounting shaft 346 passes through the axial opening 314 of the mixer 300. In addition, the channels 326 of the mixer 300 can define a first segment 348 of the annular channel 336 that extends through the continuous flow reactor 330.

In one embodiment, the first exterior surface 344 of the elongate core 342 can define a first conical end 350 and a second conical end 352 opposite the first conical end 350. These conical shaped ends 350, 352 can help to transition the reactant flow entering the continuous flow reactor 330 at the fluid inlet end 332 into the annular channel 336 and out of the annular channel 336 at the fluid outlet end 334. As will be appreciated, other shapes besides conical can be used for the ends 350 and 352, such as, but not limited to, non-conical shapes such as hemispherical shapes.

For the various embodiments, the first and second conical ends 350, 352 and the elongate core 342 can be coupled to the mounting brackets 338, 340 with radial supports members 354 that extend between the conical ends 350, 352 and their respective mounting brackets 338, 340. In one embodiment, the radial supports members 354 can each have a helical pitch relative the longitudinal axis 356 of the elongate core 342. In one embodiment, this can impart a helical twist to the secondary reactant flow prior to entering the mixer 300.

The continuous flow reactor 330 further includes an elongate housing 360 concentrically arranged around the mixer 300 and at least a portion of the elongate core 342. As illustrated, the elongate housing 360 includes a first inner surface 362 that together with the first exterior surface 344 of the elongate core 342 define a second segment 364 of the annular channel 336. In one embodiment, the second segment 364 of the annular channel 336 can be located on either side of the first segment 348 defined by the mixer 300. For the various embodiments, both the first and second segments 348, 364 of the annular channel 336 can have the constant width dimension, as discussed herein.

The elongate housing 360 further includes an annular conduit 366 defined by a first inner surface 368 of the elongate housing 360 and the second exterior surface 322 of the elongate outer sleeve 304. The annular conduit 366 can extend completely around the second surface 322 of the elongate outer sleeve 304. The annular conduit 366 further includes an inlet 370 through which a fluid under pressure (e.g., the primary reactant flow) can flow into the annular conduit 366. In one embodiment, the inlet 370 is spaced longitudinally away from the ports 124 by a minimum predetermined distance so as to ensure proper fluid distribution to the ports 124.

The annular conduit 366 is in fluid communication with the ports 324 to allow the fluid flowing in the conduit 366 to be injected through the ports 324 of the mixer 300 into the annular channel 336. As appreciated, one or more additional fluid supply conduits or inlets may be operatively connected to the annular conduit 366.

For the various embodiments, the flow rate of the fluid moving through ports 324 from the annular conduit 366 is not necessarily uniform. For example, for a constant inlet fluid pressure and for ports 324 of the same dimensions, the volumetric flow rates can increase for the ports 324 further from the inlet 370 as compared to those ports 324 closer to the inlet 370. In other words, the port 324 further downstream of the inlet 370 can have a higher volumetric flow rate as compared to ports 324 that are positioned closer to the inlet 370.

As discussed herein for the mixer 300, different features of the continuous flow reactor 330 can have predetermined proportional relationships that allows for the dimensions of specific features to be determined based on specifying the dimension of one of the features. So, for example, given that the diameter of the first surface 320 has a nominal value of 1.00, the diameter of the elongate inner sleeve 302 measured at the outside surface 316 has a relative value of 0.81 (i.e., eighty-one percent of the value of inner diameter of the elongate outer sleeve 304). The outer surface 372 of the elongate housing 360 has a relative value of 1.8. Similarly, the constant width dimension of the annular channel 336 can have a relative value in a range of 0.01 to 1.0 to the inner diameter of the elongate outer sleeve 304. In one specific embodiment, the constant width dimension of the channel has a relative value of 0.09 to the inner diameter of the elongate outer sleeve 304. In an additional embodiment, the diameter of the port 324 can have a relative value of 0.04 (i.e., four percent of the value of inner diameter of the elongate outer sleeve 304). In an additional embodiment, each of the plurality of ports 324 can have a ratio of 0.4 for the diameter of each port relative to the constant width dimension of the annular channel 326.

Using these relative values then allows the dimension of the different features of the continuous flow reactor 330 to be determined from specifying one dimensional value for the related features. For example, when the annular channel 336 has a constant width of about 3.2 cm (i.e., the distance between the outside surface 316 of the elongate inner sleeve 302 and the first surface 320 of the elongate outer sleeve 304) the diameter measured between the first surface 320 would have a value of about 35.3 cm, each port 324 would have a diameter of about 1.4 cm, and the diameter of the elongate inner sleeve 302 measured at the outside surface 316 would be about 28.6 cm. In addition the diameter measured between the outer surface 372 of the elongate housing 360 would be about 63.5 cm. Examples of other dimensions of the continuous flow reactor 330 include a length of about 1.5 to about 1.8 meters, and a diameter of the inlet 370 of about 25.4 to about 28.0 cm.

In an alternative embodiment, the constant width dimension of the annular channel 336 can have a constant value without regard to predetermined proportional relationships to other features of the mixer 300 and/or the continuous flow reactor 330. For example, the annular channel 336 can have a constant value of about 3.2 cm regardless of the other dimensions of the features in the continuous flow reactor 330.

For the various embodiments, the annular channel 336 of the continuous flow reactor 330 has a cross-sectional area that can accommodate liquid volumetric flow rates of 10 to 19 cubic meters per minute through the second end 310 of the elongate inner sleeve 302. In an additional embodiment, the annular channel 336 of the continuous flow reactor 330 can accommodate liquid flow rates of less than 10 cubic meters per minute hour or greater than 19 cubic meters per minute through the second end 310 of the elongate inner sleeve 302.

In one embodiment, the ports 324 can have a total cross-sectional area that is sufficient to accommodate a primary reactant flow volume of two-thirds (⅔) of the total volume flowing through the second end 310 of the elongate inner sleeve 302. This volume of the primary reactant flow can be injected through the ports 324 as jets into the secondary reactant flow, which makes up the remaining one-third (⅓) of the total volume moving through the channels 326 of the mixer 300. In other words, the major flow volume moving through jetted into the mixer has a flow volume that can be at least twice that of the minor flow volume moving through the channel. Other flow ratios as discussed herein are possible.

Embodiments of the continuous flow reactor 330 and the mixer 300 are useful in a variety of applications. Illustrative non-limiting uses include improving mixing of sensitive (selective) fast-reacting flows. For example, a commercially-significant use of the continuous flow reactor and the mixer of the present disclosure would be in the reaction of an olefin chlorohydrin (e.g., propylene chlorohydrin) with a base, such as sodium hydroxide, potassium hydroxide, or calcium hydroxide to yield an epoxide. One specific example for the use of the continuous flow reactor and the mixer of the present disclosure includes producing propylene oxide from propylene chlorohydrin and sodium hydroxide. Embodiments of the continuous flow reactor and the mixer of the present disclosure can also be useful in mixing miscible liquid-liquid reactants, reagents that produce precipitants, dissolve solids, gas-liquid systems, polymerization, and immiscible liquid-liquid systems.

Many of the products and/or reagents used in the continuous flow reactor and the mixer of the present disclosure can be highly corrosive, either due to their pH, the reaction temperatures and/or the flow rates being used, among other factors. As such, it is recognized that the mixer and/or the other components of the continuous flow reactor (e.g., the elongate core and the elongate housing) many need to be formed of corrosive resistant materials.

In addition, it has been discovered that the mixer is preferably formed from a material that is different than the remainder of the continuous flow reactor. For example, the mixer can be formed of a first material while the elongate core and the elongate housing can be formed of a second material that is different than the first material. As discussed herein, the first material suitable for forming the mixer can include corrosion resistant polymers and ceramics. Suitable materials for the second material used to form the elongate core and the elongate housing can include corrosion resistant metal selected from the group of titanium, titanium alloys (e.g., grade 7 titanium), austenitic stainless steels, ferritic stainless steels, precipitation hardenable stainless steel, among others. In one specific embodiment, the mixer can be formed from a fluoropolymer and the remainder of the continuous flow reactor can be formed from grade 7 titanium. Other combinations of materials are also possible.

Figure 4:
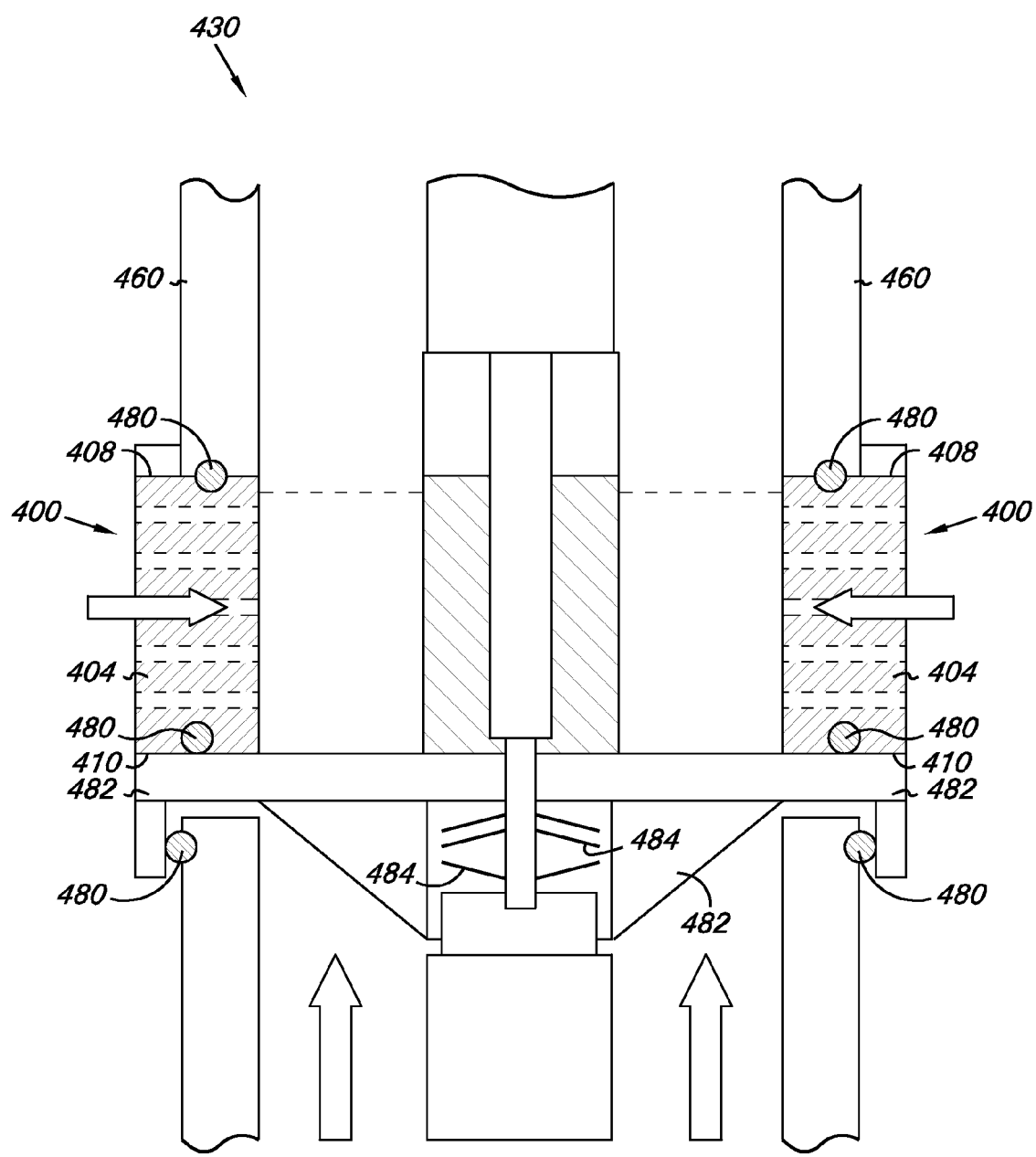
FIG. 4 illustrates a cross-sectional view of a segment of the continuous flow reactor and mixer according to one embodiment of the present disclosure.

FIG. 4 illustrates a cross-sectional view of a segment of the continuous flow reactor 430 and mixer 400 according to an additional embodiment of the present disclosure. As discussed herein, the mixer 400 can be formed from a first material that is different than a second material used for form the remaining portion of the continuous flow reactor 430. As such, as operating conditions change in the continuous flow reactor (e.g., changes in temperature), the mixer 400 and the remaining portions of the continuous flow reactor 430 can expand and/or contract at different rates and to different extents.

FIG. 4 illustrates an approach to addressing these issues by including an O-ring 480 positioned between each of the first end 408 and the second end 410 of the elongate outer sleeve 404 and the elongate housing 460. In one embodiment, either one or both the elongate outer sleeve 404 and/or the elongate housing 460 can further include an annular groove to receive the O-ring 480.

In addition, the continuous flow reactor 430 and mixer 400 can include a pusher type seal 482 positioned between the elongate core 442 and the mixer 400. The pusher type seal 482 can include a biasing member 484 positioned between the elongate core 442 and the elongate inner sleeve 402 of the mixer 400 to provide a compressive force between the mixer 400 and the elongate core 442 and the elongate housing 460. In one embodiment, the biasing member 484 can be a Belleville washer.

Figure 5:
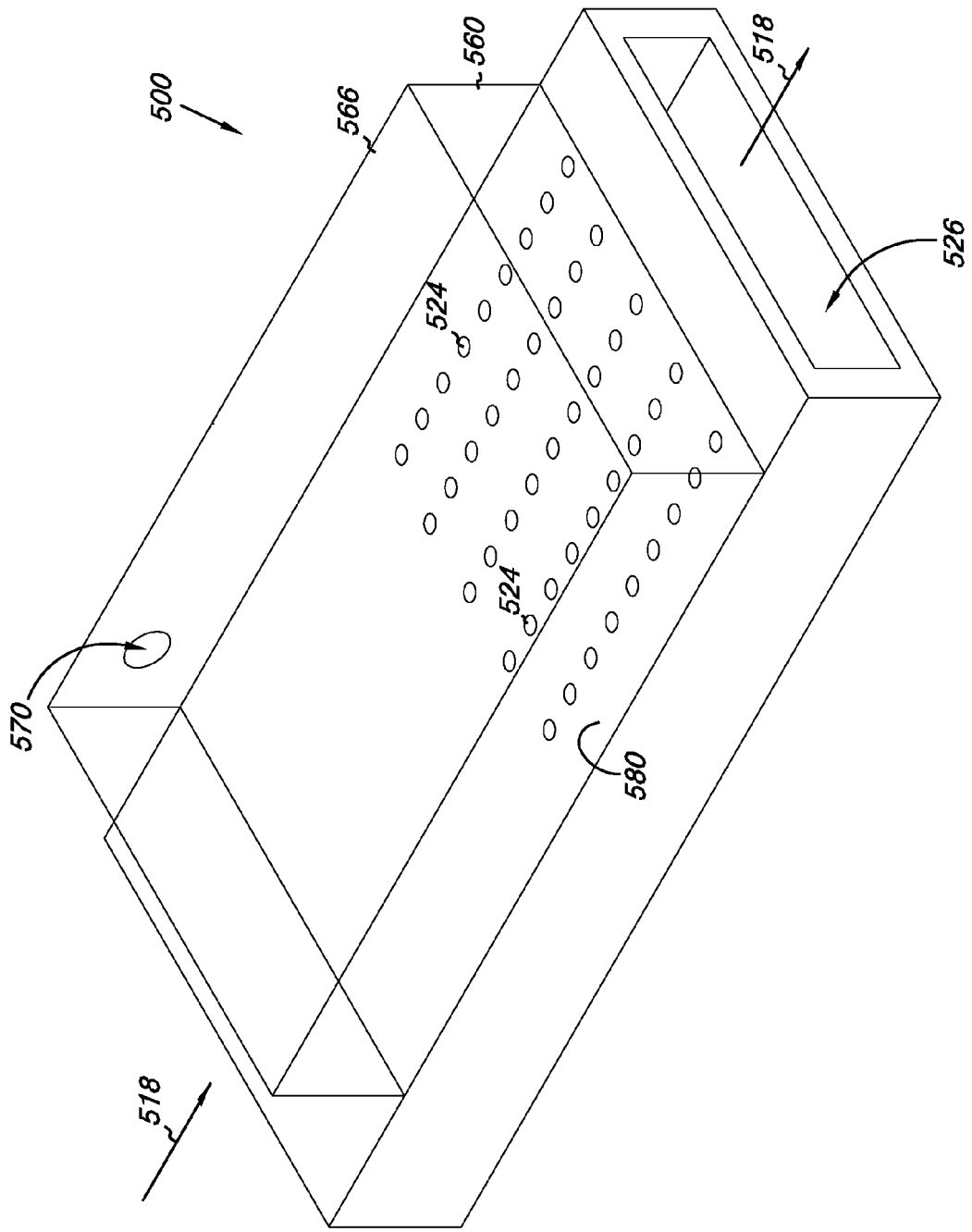
FIG. 5 illustrates one embodiment of a mixer for a continuous flow reactor according to the present disclosure.

FIG. 5 provides an illustration of an alternative embodiment of the mixer 500 according to the present disclosure. Mixer 500 can have a channel 526 that has a rectangular cross-sectional shape taken perpendicular to the longitudinal axis 518 of the mixer 500. As discussed herein, the channel 526 has a constant width dimension. The mixer 500 also includes a plurality of ports 524 that provide fluid communication between the channel 526 and a conduit 566 formed by the outside surface 580 of the channel 526 and the housing 560.

For the various embodiments, the ports 524 segment the primary reactant flow into many smaller flows that are injected as jets into the secondary reactant flow. The secondary reactant flow and the combined reactant flows are constrained to the channel 526 of constant width dimension to enhance even flow distribution and local turbulence. The jets of the first reactant flow are sized to permeate to the opposite wall at nominal operating conditions to provide good mixing and turndown of the reagents in the mixer 500.

In addition, the flow rate of the fluid moving through ports 554 from the conduit 566 is not necessarily uniform. For example, for a constant inlet fluid pressure and for ports 524 of the same dimensions, injecting the segmented primary reactant flow through the ports 524 can provide a greater volumetric flow rate of the segmented primary reactant flow through a first portion of the plurality of ports (e.g., those ports 524 furthest from the inlet 570) as compared to a second portion of the plurality of ports (e.g., those ports 524 closer to the inlet 570). In other words, the port 524 further downstream of the inlet 570 can have a higher volumetric flow rate as compared to ports 524 that are closer to the inlet 570.

As discussed herein, the embodiments of the mixer of the present disclosure can have a one piece structure. A variety of methods can be used to form the mixer having the one piece structure according to the present disclosure. For example, the mixer can be formed from a right circular cylinder of a first material, as discussed herein. An axial opening can be formed by drilling and/or milling through the right circular cylinder of the first material.

The drilling and/or milling techniques can also be used to form the two or more channels having the constant width through the right circular cylinder of the first material. As discussed herein, the two or more channels can be concentrically arranged with the axial opening formed in the first material. The ports can also be formed through the right circular cylinder by either the drilling and/or milling techniques to connect the two or more channels to an exterior surface of the right circular cylinder. In an alternative embodiment, embodiments of the mixer can be formed using molding, casting and/or sintering techniques to provide a one piece construction process.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A method of forming a mixer for a continuous flow reactor, comprising:
    forming an elongate inner sleeve with an inside surface and an outside surface opposite the inside surface, where the inside surface defines an axial opening; and
    forming an elongate outer sleeve having a first surface, a second surface opposite the first surface and a plurality of ports extending through the first surface and the second surface of the elongate outer sleeve, where the elongate outer sleeve has an inner diameter measured between the first surface through a longitudinal axis of the elongate outer sleeve that allows the elongate outer sleeve to be concentrically arranged with the elongate inner sleeve to form an annular channel that extends through the first end and the second end of the elongate inner sleeve.

2. The method of claim 1, where forming the elongate outer sleeve provides the annular channel with a constant width dimension relative the inner diameter of the elongate outer sleeve in a range of 0.01 to 1.0.

3. The method of claim 1, where forming the elongate outer sleeve provides the annular channel with a constant width dimension of about 3.2 cm.

4. The method of claim 1, where forming the elongate inner sleeve provides the outside surface with an unbroken continuous wall having an arcuate surface.

5. The method of claim 1, where forming the elongate outer sleeve provides each of the plurality of ports with a diameter relative to a width of the annular channel of 0.4.

6. The method of claim 1, where forming the elongate outer sleeve provides the plurality of ports with a cross sectional area sufficient to accommodate delivery of a major flow volume into the annular channel of the mixer.

7. The method of claim 1, including concentrically arranging the elongate outer sleeve with the elongate inner sleeve to form the annular channel for the continuous flow reactor.

8. A method of forming a continuous flow reactor, comprising:
    providing an elongate core having a first exterior surface and a mounting shaft;
    positioning a mixer around the mounting shaft, the mixer having:
        an elongate inner sleeve with an inside surface defining an axial opening through which the mounting shaft passes, and an outside surface opposite the inner surface;
        an elongate outer sleeve concentrically arranged with the elongate inner sleeve, the elongate outer sleeve having a first surface, a second surface opposite the first surface and a plurality of ports extending through of the first and second surface of the elongate outer sleeve, where the elongate outer sleeve has an inner diameter measured between the first surface through a longitudinal axis of the elongate outer sleeve so that the elongate outer sleeve is concentrically arranged with the elongate inner sleeve to form an annular channel that extends through the first end and the second end of the elongate inner sleeve; and
    an elongate housing concentrically arranged around the mixer and at least a portion of the elongate core, where the first exterior surface of the elongate core and a first inner surface of the elongate housing to define a second segment of the annular channel, and where an interior surface of the elongate housing and the second surface of the elongate outer sleeve define an annular conduit having an inlet through which a fluid can pass into the annular conduit and through the plurality of ports into the annular channel.

9. A method of operating a continuous flow reactor, comprising:
    providing an elongate inner sleeve with an inside surface and an outside surface opposite the inside surface, where the inside surface defines an axial opening that receives a mounting shaft that extends through a first end and a second end of the elongate inner sleeve;

positioning the elongate inner sleeve over the mounting shaft, where the mounting shaft extends through the first end and the second end of the elongate inner sleeve;

providing an elongate outer sleeve having a first surface, a second surface opposite the first surface and a plurality of ports extending through the first surface and the second surface of the elongate outer sleeve, where the elongate outer sleeve has an inner diameter measured between the first surface through a longitudinal axis of the elongate outer sleeve that allows the elongate outer sleeve to be concentrically arranged with the elongate inner sleeve; and concentrically arranging the elongate outer sleeve with the elongate inner sleeve to form an annular channel for the continuous flow reactor that extends through the first end and the second end of the elongate inner sleeve.

10. The method of claim 9, including segmenting a primary reactant flow with the plurality of ports; and injecting the primary reactant flow segmented with the plurality of ports into a secondary reactant flow in the annular channel of the continuous flow reactor to provide a Jet Mixing Number of at least 0.9 and a time to homogeneity of less than 0.5 seconds for the primary and secondary reactant flows.

11. The method of claim 10, where injecting the primary reactant flow into the secondary reactant flow includes proving the Jet Mixing Number of 1.0 to 2.0.

12. The method of claim 10, including supplying the primary reactant flow at a flow rate that is at least twice that of the secondary reactant flow.

13. The method of claim 10, where injecting the primary reactant flow includes providing a greater volumetric flow rate of the primary reactant flow through a first portion of the plurality of ports as compared to a second portion of the plurality of ports.

* * * * *